US 8,379,266 B2

(12) United States Patent
Obrecht et al.

(10) Patent No.: US 8,379,266 B2
(45) Date of Patent: Feb. 19, 2013

(54) SYSTEMS AND METHODS FOR GENERATING LUMINANCE LOOK-UP TABLE BASED ON COLOR COMPONENT VALUES

(75) Inventors: Douglas Obrecht, Longmont, CO (US); Stuart Guarnieri, Laramie, WY (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 781 days.

(21) Appl. No.: 12/242,687

(22) Filed: Sep. 30, 2008

(65) Prior Publication Data
US 2010/0079815 A1 Apr. 1, 2010

(51) Int. Cl.
*H04N 1/60* (2006.01)

(52) U.S. Cl. ........ 358/1.9; 358/3.23; 358/518; 358/520; 358/523

(58) Field of Classification Search .................... None
See application file for complete search history.

(56) References Cited

U.S. PATENT DOCUMENTS

| | | | |
|---|---|---|---|
| 4,583,116 A | 4/1986 | Hennig et al. |
| 4,700,399 A | 10/1987 | Yoshida |
| 4,931,861 A | 6/1990 | Taniguchi |
| 5,131,058 A | 7/1992 | Ting et al. |
| 5,204,918 A | 4/1993 | Hirosawa |
| 5,241,396 A | 8/1993 | Harrington |
| 5,295,236 A | 3/1994 | Bjorge et al. |
| 5,313,570 A | 5/1994 | Dermer et al. |
| 5,386,223 A | 1/1995 | Saitoh et al. |
| 5,386,483 A | 1/1995 | Shibazaki |
| 5,402,530 A | 3/1995 | Boenke et al. |
| 5,440,652 A | 8/1995 | Ting |
| 5,513,300 A | 4/1996 | Shibazaki |
| 5,542,052 A | 7/1996 | Deutsch et al. |
| 5,613,046 A | 3/1997 | Dermer |
| 5,615,314 A | 3/1997 | Schoenzeit et al. |
| 5,666,543 A | 9/1997 | Gartland |
| 5,668,931 A | 9/1997 | Dermer |
| 6,341,020 B1 | 1/2002 | Rumph et al. |
| 6,345,117 B2 | 2/2002 | Klassen |

(Continued)

FOREIGN PATENT DOCUMENTS

| | | |
|---|---|---|
| EP | 0 901 096 B1 | 3/1999 |
| EP | 0 996 281 A2 | 4/2000 |

(Continued)

OTHER PUBLICATIONS

Office Action dated Feb. 3, 2011, in related U.S. Appl. No. 12/286,642, filed Sep. 30, 2008, Stuart Guarnieri.

(Continued)

*Primary Examiner* — Dung Tran
(74) *Attorney, Agent, or Firm* — Finnegan, Henderson, Farabow, Garrett & Dunner, L.L.P.

(57) ABSTRACT

Systems and methods are provided for generating at least one look-up table, wherein the look-up table holds at least one luminance value in a second color space. In some embodiments, the luminance value can be computed for distinct combinations of color component values corresponding to a plurality of color components in a first color space. The method comprises computing at least one luminance value in the second color space based on a portion of the color component value combination; deriving an address in a look-up table based on the portion of the color component combination; and storing the computed luminance value in the look-up table at the derived address.

20 Claims, 5 Drawing Sheets

U.S. PATENT DOCUMENTS

| | | |
|---|---|---|
| 6,366,361 B1 | 4/2002 | Dermer et al. |
| 6,377,711 B1 | 4/2002 | Morgana |
| 6,378,983 B1 | 4/2002 | Ito et al. |
| 6,549,303 B1 * | 4/2003 | Trask ............... 358/1.9 |
| 6,738,159 B2 | 5/2004 | Harrington |
| 6,992,798 B2 | 1/2006 | Geurts et al. |
| 7,123,381 B2 | 10/2006 | Klassen |
| 7,139,098 B2 | 11/2006 | Klassen |
| 7,164,498 B2 * | 1/2007 | Van Bael ............... 358/1.9 |
| 7,259,784 B2 * | 8/2007 | Cutler ............... 348/223.1 |
| 7,263,218 B2 * | 8/2007 | Altenhof-Long et al. .... 382/162 |
| 7,362,467 B1 | 4/2008 | Tsukimura |
| 7,411,707 B2 * | 8/2008 | Ikeda ............... 358/518 |
| 7,508,550 B2 * | 3/2009 | Kameyama ............... 358/3.23 |
| 7,639,399 B2 * | 12/2009 | Ikeda ............... 358/3.03 |
| 7,679,619 B2 * | 3/2010 | Ooga et al. ............... 345/601 |
| 7,826,095 B2 | 11/2010 | Wang et al. |
| 7,847,973 B2 * | 12/2010 | Schoner ............... 358/1.9 |
| 2001/0033686 A1 | 10/2001 | Klassen |
| 2003/0044065 A1 | 3/2003 | Harrington |
| 2003/0063301 A1 | 4/2003 | Klassen |
| 2003/0090689 A1 | 5/2003 | Klassen |
| 2004/0017595 A1 * | 1/2004 | Ikeda ............... 358/518 |
| 2004/0108384 A1 | 6/2004 | Wang et al. |
| 2004/0160632 A1 * | 8/2004 | Kato et al. ............... 358/1.15 |
| 2005/0099642 A1 | 5/2005 | Segawa et al. |
| 2006/0033960 A1 | 2/2006 | Allen |
| 2006/0153441 A1 * | 7/2006 | Li ............... 382/162 |
| 2008/0007752 A1 | 1/2008 | Gandhi et al. |
| 2008/0094515 A1 | 4/2008 | Gutta et al. |
| 2010/0079815 A1 * | 4/2010 | Obrecht et al. ............... 358/3.23 |
| 2010/0079817 A1 | 4/2010 | Guarnieri et al. |
| 2010/0149201 A1 | 6/2010 | Guarnieri |

FOREIGN PATENT DOCUMENTS

| | | |
|---|---|---|
| EP | 0 996 282 B1 | 4/2000 |
| EP | 0 998 131 A2 | 5/2000 |
| EP | 1 166 548 B1 | 1/2002 |
| JP | 2006-005481 A | 1/2006 |
| JP | 2007-144929 A | 6/2007 |
| JP | 2007-221226 A | 8/2007 |
| JP | 2007-221227 A | 8/2007 |
| JP | 2008-072670 A | 3/2008 |
| WO | WO 00/57632 | 9/2000 |
| WO | WO 2008/062041 A1 | 5/2008 |

OTHER PUBLICATIONS

Office Action dated Sep. 2, 2011, in related U.S. Apple No. 12/286,642, filed Sep. 30, 2008, Stuart Guarnieri.

U.S. Appl. No. 13/369,521, filed Feb. 9, 2012.

Office Action dated Jan. 6, 2012, in related U.S Appl. No. 12/336,261, filed Dec. 16, 2008, Stuart Guarnieri.

\* cited by examiner

FIG. 3

400

```
405 ─┐ TRANSFORM_t Transformation;
       Transformation = CreateTransform("Device.icc", "CIEXYZ.icc", "AbsoluteColorimetric");

410 ──  for (c = 0; c < 16; c++) {                    /*Replicate C Value in Most Significant Nibble*/
            in[0] = (c << 4) | c;

420 ──      for (m = 0; m < 16; m++) {                /*Replicate M Value in Most Significant Nibble*/
                in[1] = (m << 4) | m;

430 ──          for (y = 0; y < 16; y++) {            /*Replicate Y-Value Most Significant Nibble*/
                    in[2] = (y << 4) | y;

440 ──              for (k = 0; k < 16; k++) {        /*Replicate K-Value in Most Significant Nibble */
                        in[3] = (k << 4) | k;

ConvertColors (Transformation, in, out, 1); /*Compute luminance value using CIE-based method*/

/*Compute Address in LUT to Store Computed Luminance Value*/
                        address = ( (in[0] & 0xf0) << 8 ) | ( (in[1] & 0xf0) << 4) | (in[2] & 0xf0) | ( (in[3] & 0xf0) >> 4) );

lookup_table[address] = out[1];    /*Store Luminance Value in LUT Table at "address" */
                    }
                }
            }
        }
```

FIG. 4

SYSTEMS AND METHODS FOR GENERATING LUMINANCE LOOK-UP TABLE BASED ON COLOR COMPONENT VALUES

TECHNICAL FIELD

This disclosure relates to the field of graphics and in particular to the determination of luminance values for color data.

DESCRIPTION OF RELATED ART

Pixels generated by a color printer typically consist of colors from multiple color planes. For example, in a color printer that uses cyan, magenta, yellow, and black ("CMYK"), a single pixel can include color from one or more of the four color planes. A wide range of colors may be produced by a printer when colors from constituent color planes are combined with differing intensities. Color for image data is typically specified in some color space in a page description language ("PDL"), and may comprise values for color data in the various color planes. Data pertaining to image color is termed chrominance. In addition to chrominance, image processing, printing, and display algorithms usually also require information pertaining to the luminance of image data. Luminance is closely related to the lightness sensitivity of human vision. Accordingly, a luminance value may be calculated for image data, which can represent the achromatic brightness of an image. Luminance and chrominance together determine how the human eye perceives an image.

In printers, for example, misregistration caused by print engine misalignment, paper stretching, and other mechanical imprecisions, may cause insufficient overlap when data from the constituent color planes that make up a single pixel is placed on a medium, resulting in unsightly small white gaps between different-colored regions on the page, or in colored edges to black regions. To redress misregistration it is common to use a technique called trapping, which expands or contracts coloring regions slightly in order to eliminate white gaps and/or colored edges between graphical objects. Trapping introduces areas of color into color separations and masks the visible effects of misregistration.

Trapping is dependent on luminance values associated with color data for determining both the direction of color flow and the quantity of color added on a per plane basis. In trapping, typically a region of higher luminance will bleed color into regions of lower luminance. In addition, if the luminance values meet certain criteria, the differences in luminance can be used to attenuate the color added from one region to another. Trapping involves the comparision of the luminance value of a pixel with those of its surrounding pixels. Since each pixel can have as many as 8 neighbors, even a small trapping area can result in a large number of luminance value calculations. For the case of a rectangular region of 3×3 pixels, there can be up to 9 luminance calculations per center pixel evaluated. This number increases as the trapping region area increases.

Color spaces in which images are specified may differ. Therefore luminance values are often computed and compared after color data is converted to a device-independent color space such as, for example, Commission Internationale de l'Eclairage XYZ (CIE XYZ) color space, or a well-defined device-dependent standard such as, for example, the standard Red-Green-Blue ("sRGB") color space, in which colors may be unambiguously specified without reference to external factors. After conversion to a CIE XYZ space, luminance values for two pixels may be computed and their respective CIE luminance values may be compared. CIE luminance values are the Y component of the CIE XYZ space. Because the computations of luminance values may consume considerable computational resources, optimization schemes related to luminance determination have the potential to speed-up graphic operations. Thus, there is a need for systems and methods to optimize luminance determination.

SUMMARY

In accordance with the present invention, systems and methods are provided for a method for generating at least one look-up table, wherein the look-up table holds at least one luminance value in a second color space. The luminance values are computed for distinct combinations of color component values corresponding to a plurality of color components in a first color space and the method comprises: computing at least one luminance value in the second color space based on a portion of the color component value combination; deriving an address in a look-up table based on the portion of the color component combination; and storing the at least one luminance value in the look-up table at the derived address.

Embodiments of the present invention also relate to software, firmware, and program instructions created, stored, accessed, or modified by processors using computer-readable media or computer-readable memory. The methods described may be performed on a computer and/or a printing device.

Additional objects and advantages will be set forth in part in the description, which follows, and in part will be obvious from the description, or may be learned by practice. The objects and advantages will be realized and attained by means of the elements and combinations particularly pointed out in the appended claims. It is to be understood that both the foregoing general description and the following detailed description are exemplary and explanatory only and are not restrictive of the invention, as claimed. These and other embodiments are further explained below with respect to the following figures.

BRIEF DESCRIPTION OF THE DRAWINGS

FIG. 3 illustrates the direction of color flow for two pixels 320 and 330 that neighbor exemplary pixel 310.
FIG. 4 shows pseudo-code illustrating an exemplary method 400 for generating a Look-Up Table ("LUT") for luminance value determination from CMYK input data consistent with disclosed embodiments.

DETAILED DESCRIPTION

Reference will now be made in detail to various embodiments, which are illustrated in the accompanying drawings. Wherever possible, the same reference numbers will be used throughout the drawings to refer to the same or like parts.

Figure 1:
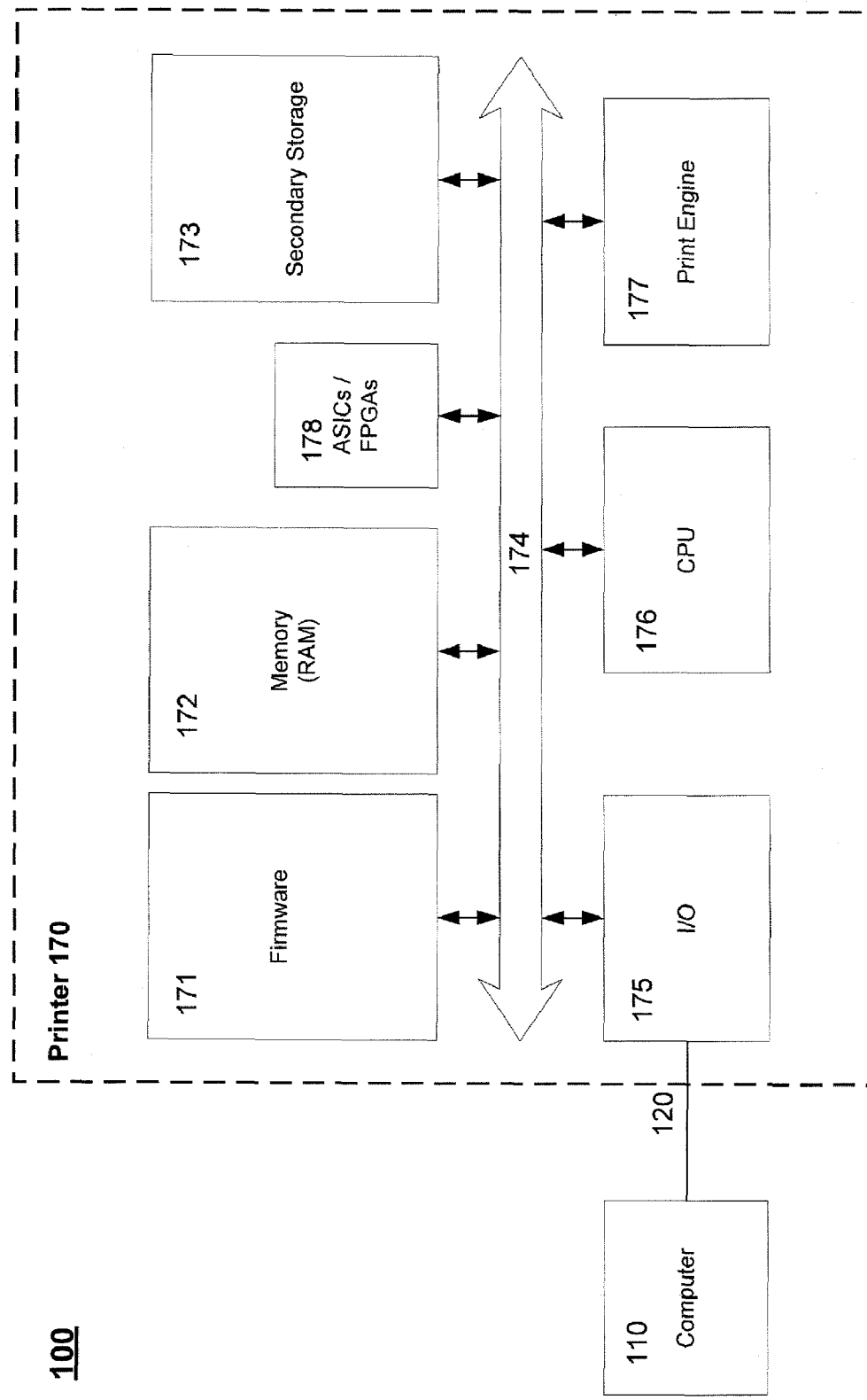
FIG. 1 shows a block diagram of an exemplary printer.

FIG. 1 illustrates an exemplary block diagram of a system 100 using a computing device 110 coupled to an output device, which is shown as exemplary printer 170, according to disclosed embodiments. Note that, in general any graphic processing device or output device that performs luminance-related computations may be used in place of, or in addition to exemplary printer 170 shown in system 100 in FIG. 1. The methods and apparatus described in this document may also be applied to these device types with appropriate modifications and in a manner consistent with embodiments disclosed herein as would be apparent to one of ordinary skill in the art. For simplicity and ease of explanation, however, the methods are described with reference to exemplary printer 170.

In general, printer 170 may be any device that can be configured to produce physical documents from electronic data including, but not limited to, electrophotographic printers, such as laser printers and LED printers, ink-jet printers, thermal printers, laser imagers, and offset printers. Printer 170 may have image transmitting/receiving function, image scanning function, and/or copying function, as installed in facsimile machines and digital copiers. The methods and apparatus described in this document may also be applied to these various printer device types with appropriate modifications and in a manner consistent with embodiments disclosed herein.

In some embodiments, printer 170 may contain one or more input-output ports 175, and printer 170 may be able to communicate with and access resources on computing device 110 using I/O ports 175 and connection 120. Printer 170 may receive input print data, including color data, from computing device 110. For example, computing device 110 may be a general purpose computer that includes a monitor to display the source color data. The general purpose computer may further include applications, such as Adobe Photoshop™ to process the print data. In some embodiments, computing device 110 may be an image generating device such as a digital camera.

Computing device 110 may be coupled to printer 170 via a wired or wireless connection 120 using conventional communication protocols and/or data port interfaces. In general, connection 120 can be any communication channel that allows transmission of data between the devices. In one embodiment, for example, the devices may be provided with conventional data ports, such as parallel ports, serial ports, Ethernet, USB™, SCSI, FIREWIRE™, and/or coaxial cable ports for transmission of data through the appropriate connection. The data port may be a wired or wireless port.

Computing device 110 may use a source color space to represent the source color data, such as, a sRGB color space, a CMY color space, a CMYK color space, or any other types of color spaces. Printer 170, on the other hand, may use a color space native to printer 170 to represent color data. In some embodiments, the native color space of printer 170 may not match the source color space of computing device 110. Therefore, a color conversion of the source color data from the source color space to the native color space of printer 170 may be performed to print color data using printer 170. In some embodiments, one or more color space conversions may be performed by using a conversion to an intermediate color space such as a Profile Connection Space ("PCS"), which in one instance may be a CIE XYZ color space.

Printer 170 may further include bus 174 that couples CPU 176, firmware 171, memory 172, print engine 177, and secondary storage device 173. Printer 170 may also include other Application Specific Integrated Circuits (ASICs), and/or Field Programmable Gate Arrays (FPGAs) 178 that are capable of executing portions of an application to perform color space conversions in a manner consistent with disclosed embodiments. In some embodiments, printer 170 may also be capable of executing software including a printer operating system and other appropriate application software, including software to perform color space conversions. In some embodiments, printer 170 may allow paper sizes, output trays, color selections, and print resolution, among other options, to be user-configurable.

In some embodiments, CPU 176 may be a general-purpose processor, a special purpose processor, or an embedded processor. CPU 176 can exchange data including control information and instructions with memory 172 and/or firmware 171. Memory 172 may be any type of Dynamic Random Access Memory ("DRAM") such as but not limited to SDRAM, or RDRAM. Firmware 171 may hold instructions and data including, but not limited to, a boot-up sequence, pre-defined routines, routines to perform color space conversions, luminance computations, look-up tables, and other code. In some embodiments, code and data in firmware 171 may be copied to memory 172 prior to being acted upon by CPU 176. In some embodiments, data and instructions in firmware 171 may be upgradeable.

In some embodiments, firmware 171 may also include routines to perform luminance-related computations, and store the values in memory 172. In some embodiments, the routines may include code that can be executed by CPU 176 and/or computing device 110 to perform portions of various luminance-related computations. Routines in firmware 171 may also include code to process the input color data and related color space information received from computing device 110.

It is also contemplated that portions of routine to perform one or more luminance-related computations may be stored on a removable computer readable medium, such as a hard drive, computer disk, CD-ROM, DVD ROM, CD±RW or DVD±RW, USB flash drive, memory stick, or any other suitable medium, and may run on any suitable subsystem of printer 170. For example, portions of applications to perform computations related to luminance determination may reside on a removable computer readable medium and be read and acted upon by CPU 176 using routines in firmware 171 that have been copied to memory 172.

In some embodiments, CPU 176 may act upon instructions and data and provide control and data to ASICs/FPGAs 178 and print engine 177 to generate printed documents. In some embodiments, ASICs/FPGAs 178 may also provide control and data to print engine 177. FPGAs/ASICs 178 may also implement one or more of translation, compression, and color conversion algorithms.

In some embodiments, input color data, a source color profile, native color profile, computed look-up tables, and converted color data may be stored in memory 172 or secondary storage 173. A source color profile can describe input color data 215 (FIG. 2), while a native color profile can describe the color behavior of the Print Engine 177. Exemplary secondary storage 173 may be an internal or external hard disk, Memory Stick™, or any other memory storage device capable of being used in and/or coupled to printer 170. Memory to store computed values and look-up tables may be a dedicated memory or form part of a general purpose memory, or some combination thereof according to some embodiments of the present invention. In some embodiments, memory may be dynamically allocated to hold the look-up table as needed. In some embodiments, memory allocated to store the look-up table may be dynamically released after processing.

Figure 2:
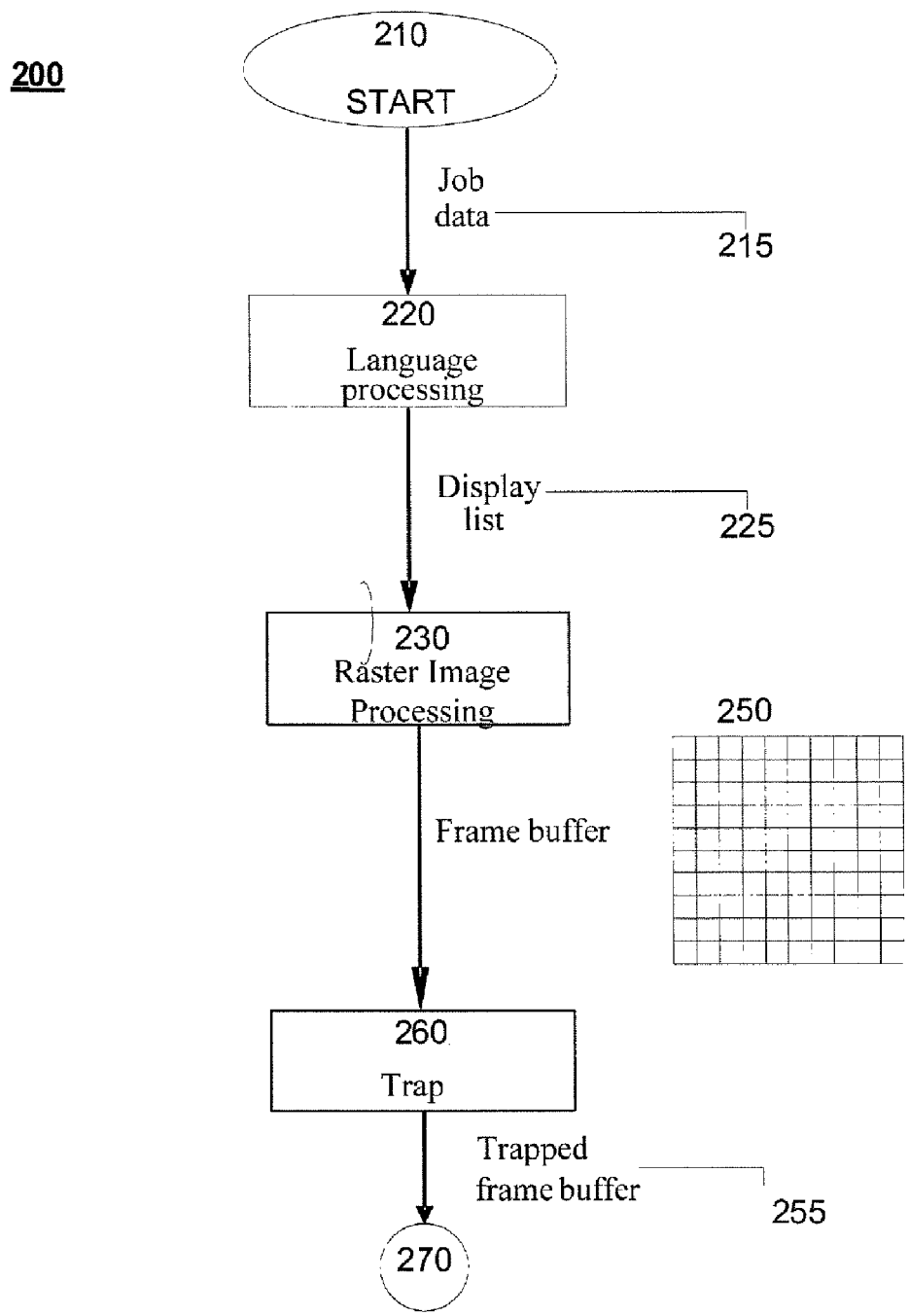
FIG. 2 shows a block diagram indicating an exemplary data flow for color conversion.

FIG. 2 shows exemplary flowchart illustrating steps in an exemplary method 200 for performing luminance-related computations on color data. The process may start in step 210 with the initiation of a print job. In step 220, print job data 215 can be subjected to language processing. In some embodiments, language processing may be performed by a language server. For example, a language server may take PDL language-level objects and transform the language level objects into data, image, text, and graphical objects and add these objects to display list 225.

In some embodiments, language processor 220 may be configured to receive and process print job data 215, which may include one-dimensional color data (e.g., gray scale) or multi-dimensional color data (e.g., RGB). In some embodiments, print job data 215 may further include an input color profile 201 that describes information related to the source color space used by computing device 110. In some embodiments, color conversion schemes may make use of an International Color Consortium (ICC) specification.

The ICC specification permits the creation of a device-specific profile that describes the native device color space for a device, and additional related information needed to convert color data between this native device color space and a device independent color space, or PCS. The ICC profile format supports a variety of device-dependent and device-independent color spaces, including, for example, CIE XYZ based color spaces, RGB based color spaces, and CMYK based color spaces.

In some embodiments, the input color profile may specify a source color space. For example, a commonly known and/or widely used color space such as sRGB may be specified by input color profile 201. In one embodiment, a detailed ICC specification of the sRGB may be stored in memory 172 or secondary storage 173 of printer 170, and language processor 220 may recognize the sRGB color space and obtain the corresponding ICC specification. In some embodiments, input color profile 201 may include the detailed ICC specification of the source color space.

Exemplary display list 225 may be an intermediate step in the processing of data prior to actual printing and may be parsed before conversion into a subsequent form. The conversion process from a display list representation to a form suitable for printing on physical media may be referred to as rasterizing the data or rasterization. Display list 225 may include such information as color, opacity, boundary information, and depth for display list objects, and some or all of this information may be used in luminance-related computations.

For example, basic rasterization may be accomplished by taking a 3-dimensional scene, typically described using polygons, and rendering the 3-dimensional scene onto a 2-dimensional surface. Polygons can be represented as collections of triangles. A triangle may be represented by 3 vertices in the 3-dimensional space. A vertex defines a point, an endpoint of an edge, or a corner of a polygon where two edges meet. Thus, basic rasterization may transform a stream of vertices into corresponding 2-dimensional points and fill in the transformed 2-dimensional triangles. Upon rasterization, the rasterized data may be stored in a frame buffer, such as exemplary frame buffer 250, which may be physically located in memory 172. Print engine 177, may process the rasterized data in frame buffer 250, and form a printable image of the page on a print medium, such as paper.

In step 230, Raster Image Processing (RIP) module may process objects in display list 225 and generate a rasterized equivalent in frame buffer 250. In some embodiments, raster image processing may be performed by printer 120. For example, raster image processing may be performed by printer 120 using one or more of CPU 176, ASICs/FPGAs 178, memory 172, and/or secondary storage 173. Raster image processing may be performed by printer 170 using some combination of software, firmware, and/or specialized hardware such as ASICs/FPGAs 178. Frame buffer 250 may hold a representation of print objects in a form suitable for printing on a print medium by print engine 177.

Data in frame buffer 250 may then be subjected to one or more post-processing routines, such as trapping, in step 260. Any of several well-known trapping algorithms may be used to perform trapping. Trapped frame buffer 255 may then be subjected to any additional processing in step 270. For example, print engine 177 may render trapped frame buffer 355 on a print medium after further processing.

As noted earlier, trapping is dependent on luminance information for determining both the direction of color flow and the quantity of color added on a per plane basis. Typically, the flow of color occurs from regions with higher luminance values that will bleed color into regions with lower luminance values. Further, the difference in luminance value can be used to attenuate the color added from one region to another.

FIG. 3 illustrates the direction of color flow for two pixels 320 and 330 that neighbor exemplary pixel 310. For example, pixels 320 and 330 could lie to the immediate right and immediate left of pixel 310, respectively. As shown in FIG. 3, pixel 310 is cyan, with value of C=128 for the cyan plane; all other planes have zero values. Similarly, pixel 320 is magenta, with a value of M=128; all other planes have zero values. Pixel 330 has a cyan plane value C=128 and a yellow plane value Y=96; all other planes have zero values, i.e. M=K=0. As shown in FIG. 3, the luminance values of pixels 310, 320, and 330 are 120194, 110850, and 117856, respectively. Therefore, pixel 310 has a higher luminance value than pixels 320 and 330. Accordingly, color will bleed from pixel 310 to pixels 320 and 330, as illustrated by the arrow.

Typically, for CMYK print job data, luminance calculations can be approximated by an equation using CMYK inputs. Accordingly, because a pixel may have as many as eight neighbors, in conventional processing schemes, luminance value calculations may require as many as 9 calculations and 8 comparisions per pixel.

An exemplary luminance equation can be based upon the Rec. 601 National Television Standards Committee ("NTSC") television standard. For RGB color spaces, the equation is given as:

$$L601 = 0.299R + 0.587G + 0.114B \quad (1),$$

where R, G, and B are values of the Red, Green, and Blue planes, respectively, for a pixel, and L601 is the luminance value per the Rec. 601 standard. Equation (1) may be modified for CMYK color spaces, to yield:

$$L601 = 1.0 - ((0.299C + 0.587M + 0.114Y + K) \quad (2),$$

where C, M, Y, and K are values of the Cyan, Magenta Yellow, and Black planes, respectively, for a pixel, and L601 is the luminance value per the Rec. 601 standard.

Equation (2) does not consider the device specific profile of the CMYK output device, which can be printer 170. Equation (2) is based on the assumption that the output device color profile allows the device to faithfully represent the entire color space (100% of each of the Cyan, Magenta, Yellow, and Black color planes). However, the gamut of many output devices may be limited and a device may not be capable of representing the entire space. The gamut of a device or process is that portion of the color space that can be represented, or reproduced by the device or process.

Typically, toner-based electro-photographic printers may not be able to represent the entire color space. Limitations associated with these devices may permit representation of some portion of the color space. Accordingly, approximations may be used to represent colors that cannot be represented in the color space. For example, in a procedure called Under-color Removal/Black Generation ("UCR/BG") the coverage of Cyan, Magenta, and Yellow may be reduced by a certain amount, while the coverage of Black increased. Approximations such as UCR/BG may degrade the accuracy of Equation 2.

In an alternate approach, equations based on a CIE color space can be used to determine the luminance. In a CIE color space based approach, luminance is determined by calorimetrically converting the device specific CMYK color space to CIE XYZ. The Y-component of the CIE XYZ color space represents luminance. Typically, the conversion from a device specific CMYK color space to CIE XYZ is performed by creating a color transform, and then using the color transform to perform any color space conversions. In some embodiments, a color transform can be created by concatenating the device's ICC color profile with an ICC CIE XYZ color profile. In some embodiments, device's ICC profile can be created with the appropriate UCR/BG process built into the profile. As traditionally performed, the computation of luminance values using the CIE color space based approach can be computationally expensive and sub-optimal and requires at least one non-trivial color transform computation per pixel.

FIG. 4 shows pseudo-code illustrating an exemplary method 400 for generating a Look-Up Table ("LUT") for luminance value determination from CMYK input data consistent with disclosed embodiments. In exemplary method 400, pixel data for each color plane is 8-bits. However, the method may be applied to data of arbitrary length by appropriate modifications, as would be apparent to one of ordinary skill in the art. In some embodiments, the LUT may be used to calculate a luminance value from CYMK input data after the LUT has been populated with calculated luminance values. Note that the pseudo-code may be modified easily to determine luminance values for any input color data that comprises N-planes. For example, method 400 may be used to calculate luminance values from RGB input color.

In some embodiments, method 400 may be seen as comprising three steps. First, a luminance value can be computed for a combination of the upper four bits or the Most Significant Nibble ("MSN") of (C,M,Y,K) components of a pixel. Next, an address is in the Look-Up Table ("LUT") is computed to hold the luminance value. In some embodiments, the LUT address is derived based on the MSN of the (C,M,Y,K) components. Then, the luminance value may be stored in the LUT at the computed address. Because there are 16 possible permutations of bits in a nibble, there are 16 possible values for the MSN for each of the color components. The process is repeated for all combinations of the MSN of the (C,M,Y,K) components. Accordingly, in some embodiments, luminance values can be calculated for a total of $(16)^4$ or $(2)^{16}$ combinations of (C,M,Y,K) values and stored at appropriate locations in the LUT.

As shown in FIG. 4, exemplary method 400 comprises a function Transformation( ) 405, which can compute a color transform using a Device ICC Profile and a CIEXYZ Profile. In some embodiments, method 400 can comprise four nested loops, 410, 420, 430, and 440 for the Cyan, Magenta, Yellow, and Black component planes respectively. Each loop can perform 16 iterations representing 16 different combinations of the upper four bits or the Most Significant Nibble ("MSN") for the data. In the innermost loop 440, a luminance value can be computed using a function ConvertColor(Transformation, in, out, 1), which invokes function Transformation( ) 405. In the parameters supplied to ConvertColor, function Transformation( ) 405 specifies the color transform, while "in" represents the input data, "out" represents the output data and "1" represents the number of color conversions to be performed. In the example shown, the operation is carried out for one pixel.

Next, in some embodiments, a 16-bit address can be computed by concatenating the MSN of C, M, Y, and K values in that order. The luminance value is then stored in the LUT at the computed address. Note that the luminance value may be truncated, rounded, or otherwise modified depending on the application prior to being stored. For example, in some embodiments, the most significant byte of the luminance value may be stored in the LUT.

Figure 5:
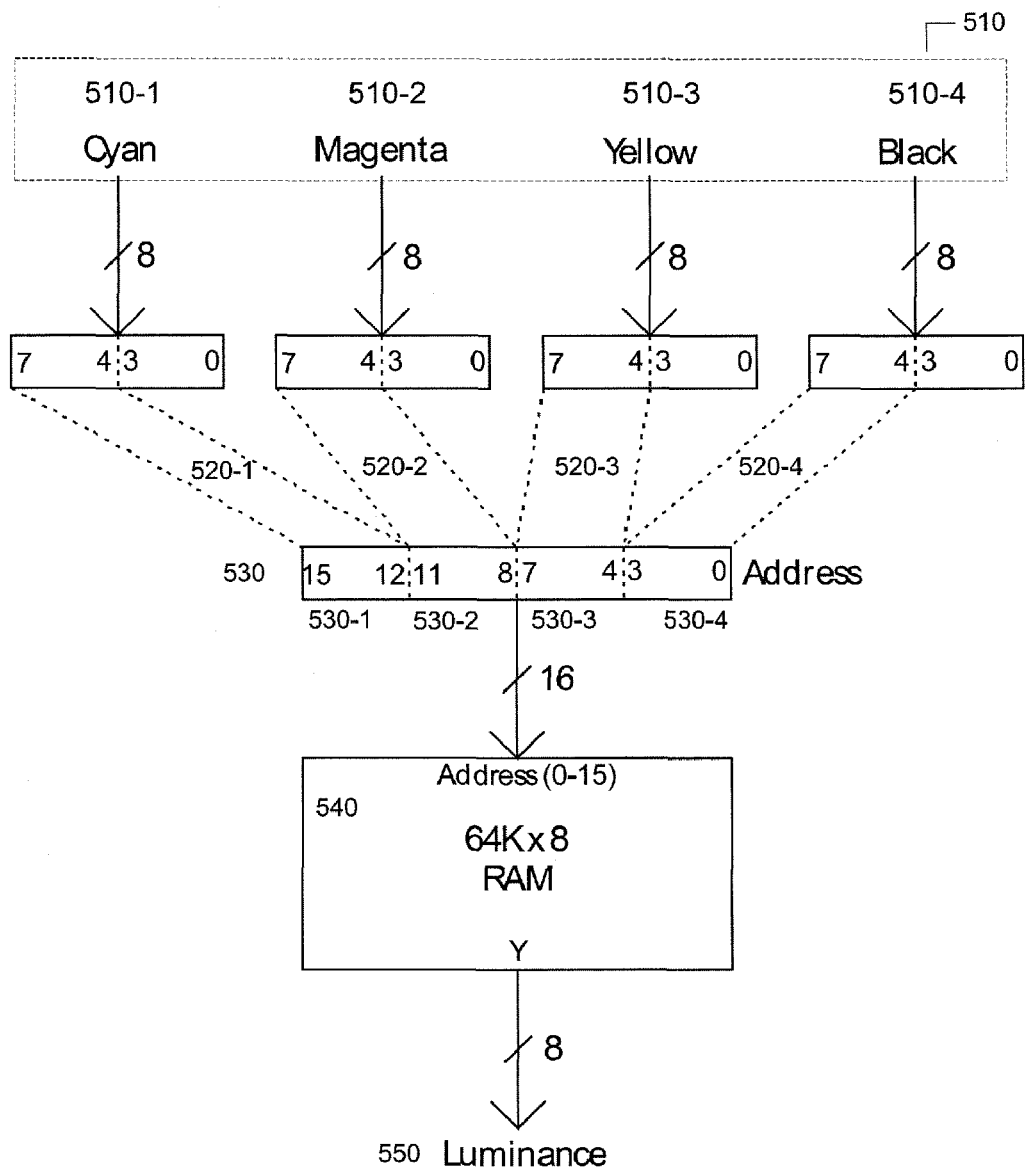
FIG. 5 illustrates an exemplary method 500 for computation of an address in the LUT.

FIG. 5 illustrates an exemplary method 500 for computation of an address in the LUT. In some embodiments, exemplary method 500 may be used to both store and look-up a value in LUT 540. In some embodiments, method 500 may be used to compute an address to look-up a luminance value in LUT 540. As shown in FIG. 5, pixel 510 comprises color components 510-1, 510-2, 510-3, and 510-4 corresponding to the C, M, Y, and K component planes respectively. The MSNs of the C 520-1, M 520-2, Y 520-3, and K 520-4 values can be extracted and concatenated in that order to form 16-bit address 530. The computed luminance value can then be retrieved by using address 530 from LUT 540. In some embodiments, LUT 540 may be stored in memory 172. In some embodiments, one or more LUTs 540 may be computed for commonly performed transformations and loaded into firmware 173. In some embodiments, one or more LUTs 540 may be loaded from firmware 173 into memory 172 when printer 170 is booted up, reset, or at an appropriate stage during the printing process. For example, one or more LUTs 540 may be loaded into memory 172, during execution of a trapping algorithm. In some embodiments, some portion of LUT 540 may be stored in a cache.

Note that in method 400, an equal weight was assigned to all color components i.e. the MSNs of the Cyan, Magenta, Yellow, Black color plane were used to compute luminance. However, the human eye is less sensitive to variations in yellow and its contribution to luminance is smaller that the other components. Accordingly, luminance calculations can be based on using 5-bits for the Cyan and Magenta components, and 3-bits for the Yellow and Black components. Appropriate modifications can be made to address computations pertaining to an address in LUT 540 for both storage and retrieval of the luminance value by modifications to the mask and shift values in methods 400 and 500.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for generating a look-up table, wherein the look-up table holds a luminance value in a second color space, the luminance value being computed for a combination of a plurality of color component values corresponding to a plurality of color components in a first color space, the method comprising:
   generating a plurality of portion values by extracting, via a computer, one portion value from each of the plurality of color component values;
   computing, via a computer, the luminance value in the second color space as a function of the plurality of portion values, the luminance value corresponding to an achromatic brightness associated with the plurality of portion values;

deriving, via the computer, an address in the look-up table by concatenating the plurality of portion values; and recording the luminance value in the look-up table at the derived address.

2. The method of claim 1, wherein the first color space is a CMYK color space.

3. The method of claim 1, wherein the first color space is an RGB color space.

4. The method of claim 1, wherein the second color space is a device independent color space.

5. The method of claim 4, wherein the device independent color space is a CIEXYZ color space.

6. The method of claim 1, wherein computing the luminance value further comprises extracting the plurality of portion values, each from a corresponding color component value.

7. The method of claim 6, wherein the plurality of portion values have identical sizes.

8. The method of claim 6, wherein the plurality of portion values do not have identical sizes.

9. The method of claim 1, wherein the look-up table is stored in memory.

10. The method of claim 1, wherein the look-up table is stored in firmware.

11. A method for retrieving a luminance value in a second color space from a look-up table, the luminance value being retrieved based on a plurality of color component values associated with an input pixel in a first color space, the method comprising:

generating a plurality of portion values by extracting, via a computer, one portion value from each of the plurality of color component values;

deriving, via the computer, an address in the look-up table, wherein the address is derived by concatenating the plurality of portion values; and retrieving the luminance value from the look-up table at the derived address, wherein the luminance value corresponds to an achromatic brightness associated with the plurality of portion values.

12. The method of claim 11, wherein the plurality of portion values have identical sizes.

13. The method of claim 11, wherein the plurality of portion values do not have identical sizes.

14. A non-transitory computer-readable medium that contains instructions which, when executed by a processor, perform steps in a method for generating a look-up table, wherein the look-up table holds a luminance value in a second color space, the luminance value being computed for a combination of a plurality of color component values corresponding to a plurality of color components in a first color space, the method comprising:

generating a plurality of portion values by extracting one portion value from each of the plurality of color component values;

computing the luminance value in the second color space as a function of the plurality of portion values, the luminance value corresponding to an achromatic brightness associated with the plurality of portion values;

deriving an address in the look-up table by concatenating the plurality of portion values; and recording the luminance value in the look-up table at the derived address.

15. The computer-readable medium of claim 14, wherein computing the luminance value further comprises extracting the plurality of portion values, each from a corresponding color component value.

16. The computer-readable medium of claim 15, wherein the plurality of portion values have identical sizes.

17. The computer-readable medium of claim 15, wherein the plurality of portion values do not have identical sizes.

18. A non-transitory computer-readable medium that contains instructions which, when executed by a processor, perform steps in a method for retrieving a luminance value in a second color space from a look-up table, the luminance value being retrieved based on a plurality of color component values associated with an input pixel in a first color space, the method comprising:

generating a plurality of portion values by extracting one portion value from each of the plurality of color component values;

deriving an address in the look-up table, wherein the address is derived by concatenating the plurality of portion values; and retrieving the luminance value from the look-up table at the derived address, wherein the luminance value corresponds to an achromatic brightness associated with the plurality of portion values.

19. The computer-readable medium of claim 18, wherein the plurality of portion values have identical sizes.

20. The computer-readable medium of claim 18, wherein the plurality of portion values do not have identical sizes.

* * * * *